(12) United States Patent
Liljenstolpe (10) Patent No.: US 10,931,744 B1
(45) Date of Patent: Feb. 23, 2021

(54) POLICY CONTROLLED SERVICE ROUTING (71) Applicant: Tigera, Inc., San Francisco, CA (US)

(72) Inventor: Christopher David Liljenstolpe, San Francisco, CA (US)

(73) Assignee: Tigera, Inc., San Francisco, CA (US)

( * ) Notice: Subject to any disclaimer, the term of this patent is extended or adjusted under 35 U.S.C. 154(b) by 214 days.

(21) Appl. No.: 15/585,095

(22) Filed: May 2, 2017

Related U.S. Application Data (60) Provisional application No. 62/448,327, filed on Jan. 19, 2017.

(51) Int. Cl.
*H04L 29/08* (2006.01)

(52) U.S. Cl.
CPC .......... *H04L 67/1004* (2013.01); *H04L 67/28* (2013.01)

(58) Field of Classification Search
CPC ....................................................... H04L 67/28
See application file for complete search history.

(56) References Cited

U.S. PATENT DOCUMENTS

| | | | | |
|---|---|---|---|---|
| 9,154,479 B1 * | 10/2015 | Sethi | ......................... | H04L 63/08 |
| 9,953,075 B1 * | 4/2018 | Reiner | .................... | G06N 20/00 |
| 2005/0204041 A1 | 9/2005 | Blinn | | |
| 2010/0275241 A1 * | 10/2010 | Srinivasan | ............ | G06F 9/5044 726/1 |
| 2011/0047590 A1 * | 2/2011 | Carr | ..................... | G06F 21/6218 726/1 |
| 2012/0054368 A1 * | 3/2012 | Brown | ....................... | G06F 9/50 709/242 |
| 2012/0185913 A1 * | 7/2012 | Martinez | ............. | G06F 9/45558 726/1 |
| 2013/0019018 A1 * | 1/2013 | Rice | ......................... | H04L 67/16 709/226 |
| 2013/0086631 A1 * | 4/2013 | Archer | .................. | H04L 65/605 726/1 |
| 2014/0351573 A1 | 11/2014 | Martini | | |
| 2015/0163158 A1 * | 6/2015 | Ryland | ................ | H04L 41/0893 709/225 |
| 2015/0188910 A1 | 7/2015 | Tsai | | |
| 2016/0248685 A1 * | 8/2016 | Pignataro | ............. | H04L 47/2441 |
| 2017/0034161 A1 * | 2/2017 | Isola | ..................... | H04L 63/145 |

* cited by examiner

*Primary Examiner* — Tonia L Dollinger
*Assistant Examiner* — Ishrat Rashid
(74) *Attorney, Agent, or Firm* — Van Pelt, Yi & James LLP (57) ABSTRACT

Metadata associated with a workload is determined. The workload is associated with a consumer of a service. One or more policies associated with the metadata are retrieved. An agent is configured to perform policy-controlled service routing of communications comprising the data packets with respect to the workload based on the one or more policies.

17 Claims, 11 Drawing Sheets

POLICY CONTROLLED SERVICE ROUTING

CROSS REFERENCE TO OTHER APPLICATIONS

This application claims priority to U.S. Provisional Patent Application No. 62/448,327 entitled POLICY CONTROLLED SERVICE ROUTING AND CRYPTOGRAPHY filed Jan. 19, 2017 which is incorporated herein by reference for all purposes.

BACKGROUND OF THE INVENTION

A computing environment can be comprised of one or more servers, each server running one or more workloads (e.g., containers, pods, virtual machines, executable code, uni-kernels, etc.). The workloads can communicate with one or more endpoints external to a server. The manner in which traffic is controlled between a workload and an endpoint is typically workload-specific. Traffic can be load balanced, blocked, encrypted, etc. In a computing environment comprised of hundreds, even thousands of workloads, it can be very time consuming to modify the control mechanisms associated with each individual workload.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A policy-controlled service routing technique is disclosed. A workload can be instantiated on a server and an orchestrator can attach metadata to the workload. The workload can be associated with a consumer or provider of a service. The metadata attached to a workload can be associated with one or more policies. Such policies control the behavior and access of the workload within a computing environment.

An agent running on the server can inspect the metadata attached to the workload and retrieve from a policy data store the one or more policies associated with the metadata attached to the workload. The agent can configure the server on which the workload is instantiated based on the one or more retrieved policies to enforce the behavior and/or access of the workload within its environment. Traffic associated with a workload can be load balanced, restricted, permitted, and/or encrypted in a particular manner based on the policy.

A plurality of workloads can have some or all of the same attached metadata. By making one or more changes to a policy, the one or more changes can be applied to the traffic of workloads controlled by such a policy. This enables the computing environment to quickly respond to problems occurring within the computing environment (e.g. workload malfunction, infected network, increases in traffic loads, etc.).

Figure 1:
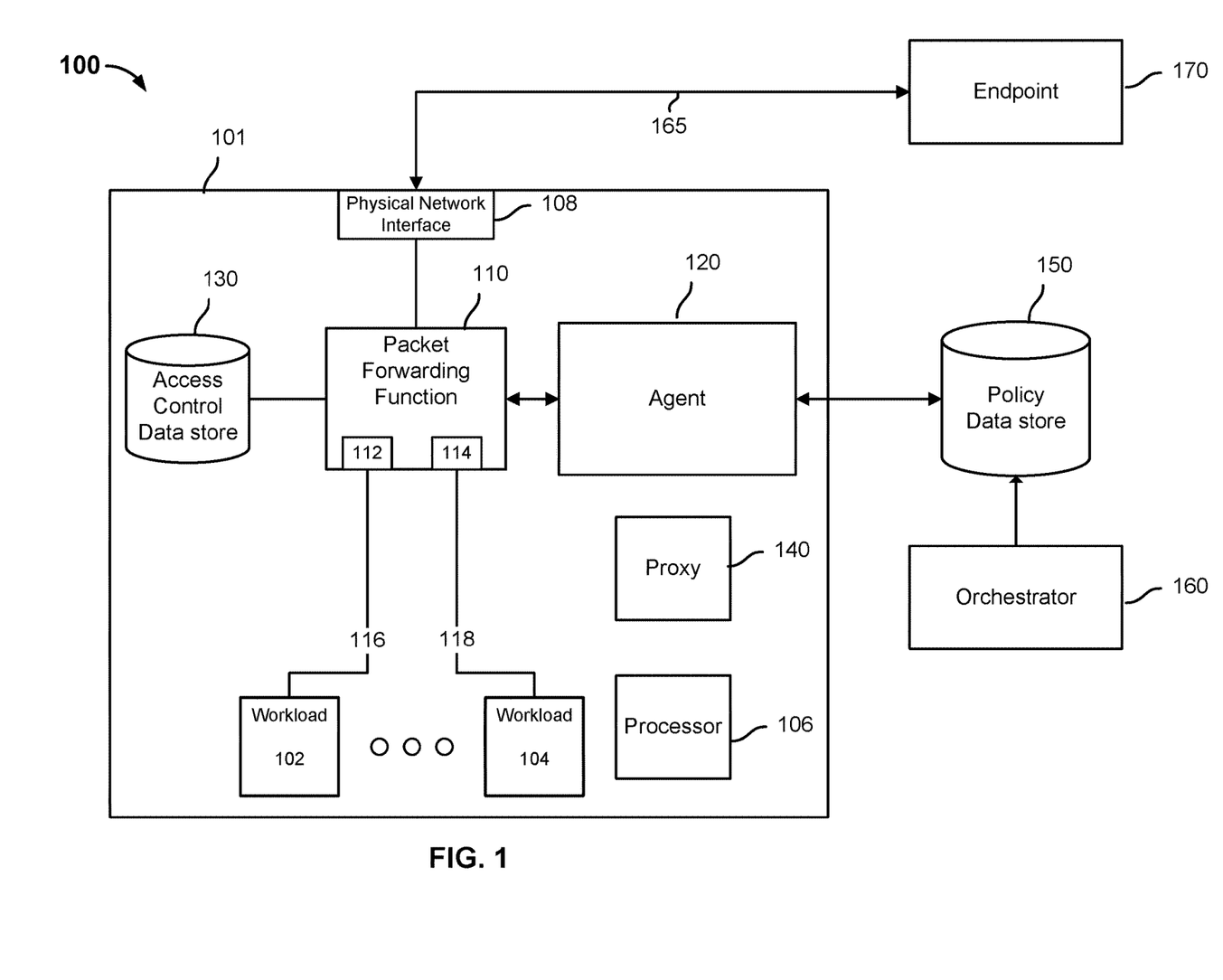
FIG. 1 is a block diagram illustrating an embodiment of a system for policy controlled service routing.

FIG. 1 is a block diagram illustrating an embodiment of a system for policy controlled service routing. The system 100 includes a server 101 comprised of one or more workloads 102, 104, a processor 106, a physical network interface 108, a packet forwarding function 110, one or more agents 120, an access control datastore 130, and one or more proxies 140. In other embodiments, server 101 can be a hardware module comprised within a server in a data center network (e.g., blade server or other hardware component).

Server 101 can include one or more workloads 102, 104. A workload can be a container, a pod, a virtual machine, executable code, a uni-kernel, etc. A workload can be associated with metadata (e.g., tag(s), label(s), key-value pair(s), etc.) that is attached to it by an orchestrator/scheduler or via other mechanisms. For example, a workload can have a label, such as "red" or "blue," or have a key-value pair (KVP), such as "role: production" or "role: development." In other embodiments, a workload can have other tags, labels, and/or key-value pairs. The metadata associated with a workload follows the workload around the cloud as the workload is instantiated, moved, destroyed, scaled up, and/or scaled down.

The metadata associated with a workload can be referenced by one or more policies. A policy can reflect an intent of how one or more associated workloads are to be used within a computing environment. For example, a policy can indicate that workloads with a "red" label and a KVP of "role: production" can access a "red_db" server, whereas workloads with a "blue" label and a KVP of "role: production" are not be able to access the "red_db" server, but are able to access a "blue_db" server.

Server 101 can include a processor or processing system 106. The processing system can be comprised of one or more processors and/or memory. Server 101 can include a physical network interface 108. In some embodiments, physical network interface 108 is configured to receive one or more data packets from one or more endpoints 170 and to forward the one or more data packets to packet forwarding function 110. In other embodiments, physical network interface 108 is configured to forward one or more data packets received from packet forwarding function 110 to one of the one or more endpoints 170. Physical network interface 108 can comprise one or more network interface cards.

Server 101 can include a packet forwarding function 110, which is configured to forward data packets that may be routed to and/or from the one or more workloads 102, 104. In some embodiments, packet forwarding function 110 forwards packets from workload 102 to workload 104 and vice versa. In other embodiments, packet forwarding function 110 forwards packets from workloads 102, 104 to one or more endpoints 170. In other embodiments, packet forwarding function 110 forwards packets from one or more endpoints 170 to workloads 102, 104.

Packet forwarding function 110 can be comprised of one or more virtual interfaces 112, 114, with a respective virtual connection 116, 118 connecting a respective workload 102, 104 to packet forwarding function 110. In some embodiments, packet forwarding function 110 is comprised within a Linux kernel running on server 101. In some embodiments, virtual interfaces 112, 114 can comprise a virtual Ethernet port, a network tunnel (tun), or a network tunnel (tap).

Server 101 can include one or more agents 120. In some embodiments, an agent can be configured to analyze the metadata associated with a workload and to retrieve from policy data store 150 one or more policies associated with the metadata. In other embodiments, an agent can be configured to determine one or more endpoints associated with a policy. For example, a policy can indicate that a workload with a "red" label is permitted to communicate with server with a "red_db" label. An agent can receive a list of servers associated with a "red_db" label from policy data store 150 and update an access control list (ACL) stored in access control data store 130 to reflect the one or more servers with a "red_db" label to which a workload with a "red" label is permitted to communicate.

In other embodiments, an agent can be configured to receive an indication from policy data store 150 when an update occurs to any of the policies stored in policy data store 150. In response to receiving an update from policy data store 150, an agent can be configured to make corresponding updates to the ACL. For example, a policy can be updated to change a role associated with workloads with a "red" label from "development" to "production." The policy may indicate that a workload with a "red" label and a "development" role can communicate with a server with a "red_db_dev" label and may indicate that a workload with a "red" label and a "production" role can communicate with a server with a "red_db_prod" label. An agent can be configured to update the ACL such that the workload with a "red" label and new "production" role is able to communicate with a server with a "red_db_prod" label instead of a server with a "red_db_dev" label.

In other embodiments, an agent can be configured to receive an indication that a workload is no longer in service. In response, an agent can be configured to update the ACL by removing entries associated with the workload that is no longer in service (e.g., server with "red" label is permitted to communicate with servers with "red_db" label.).

Server 101 can include an access control data store 130. Access control data store 130 can comprise an access control list (ACL) that includes entries of IP addresses that are allowed to communicate with a particular workload and entries of IP addresses to which the particular workload is allowed to communicate.

The IP addresses can be explicitly or implicitly specified by one or more policies. For example, a policy may indicate that a workload with a "red" label and a KVP of "role: production" can access a "red_db" server. The ACL can be updated to store the IP addresses of all servers associated with a "red_db" label. This will allow the workload with the "red" label and a KVP of "role: production" to access any of the "red_db" servers with an IP address stored in the ACL. In some embodiments, a policy can indicate a specific port forward traffic from a workload to an endpoint. For example, a policy can indicate that a workload with a "red" label and a KVP of "role: production" can access a "red_db" server via port 631. In other embodiments, a policy can indicate that a workload with a particular label can receive traffic via a specific port. For example, a policy can indicate that workloads with a "blue" label can receive incoming traffic via port 8080.

Access control data store 130 can comprise an ACL that includes entries of API endpoints that are allowed to communicate with a particular workload and entries of API endpoints to which the particular workload is allowed to communicate.

In some embodiments, access control data store 130 is updated on a periodic basis. In other embodiments, access control data store 130 is updated by an agent upon the agent detecting a change to one of the policies stored in policy data store 150. In other embodiments, an agent is configured to subscribe to policy data store updates and to update the access control data store 130.

Server 100 can include one or more proxies 140. A proxy can be configured to enforce a policy associated with one or more workloads. A proxy can be a sidecar proxy—actually included as part of the workload, an external proxy dedicated to a specific workload, or a shared proxy for a plurality of workloads. In other embodiments, the proxy can be a remote proxy located on a different host. In other embodiments, the proxy can be located in a workload. In other embodiments, the proxy can be proxy located in packet forwarding function 110 (e.g., Linux kernel, user space daemon). In some embodiments, a policy can indicate that traffic between a workload and an endpoint is to travel through a proxy. In other embodiments, a policy can indicate that traffic between a workload and an endpoint does not need to travel through a proxy.

Server 100 can be coupled to policy data store 150. Policy data store 150 can be configured to store a plurality of policies. A policy can be associated with one or more workloads. A workload can be associated with one or more different policies.

In some embodiments, policy data store 150 can store one or more policies associated with load balancing. For example, a policy can mutate the load-balancing algorithm to change the weights, priorities, destinations, and/or other load-balancing characteristics. In some embodiments, a policy can require that specific traffic can be load-balanced while other traffic is not load-balanced. For example, traffic associated with workloads having a "red" label can be load-balanced while traffic associated with workloads having a "blue" label is not load-balanced. A policy can also change the interpretation of delivery of feedback information that load-balancing mechanisms used to access the performance of the infrastructure.

In some embodiments, policy data store 150 can store one or more policies associated with application delivery control. A policy can limit which workloads can access which services based on destination, API endpoint, or other information encoded within a request or attempted application access. For example, a policy may indicate that only workloads tagged 'role:production' are allowed to "POST" to a specific set of URLs on a production database. A policy can also apply similar controls to traffic destined for workloads from external or foreign endpoints. A policy can also rewrite and/or modify or mutate the network traffic based on policy requirements. For example, during a change of an API, calls using a legacy form of the API might be re-written into the current form, based on policy requirements. A policy may be used to change an API call or destination to allow for policy-driven access control or 'Red/Blue' testing.

In some embodiments, policy data store 150 can store one or more policies associated with transport and/or session cryptography. For example, a policy can require that traffic between certain end-points and certain workloads are encrypted, either at the transport or session level. A policy can also dictate which certificates and/or keys are used for which sessions between certain endpoints and certain workloads. A policy can also only allow traffic that has been encrypted in a manner specified by the policy. A policy can require certain rules for traffic from a workload to an endpoint and different rules for traffic from the endpoint to the workload. A policy can indicate that traffic is to be re-directed to a particular enforcement agent.

Policy data store 150 can be coupled to orchestrator 160. In some embodiments, orchestrator 160 can be configured to setup the one or more workloads 102, 104 on server 101. Orchestrator 160 can assign an IP address to a workload when setting up the workload.

In some embodiments, orchestrator 160 can be configured to attach metadata to a workload. The metadata can be a tag, label, key-value pair, etc. For example, a workload can have a label, such as "red" or "blue," or have a key-value pair, such as "role: production" or "role: development." In some embodiments, orchestrator 160 can be configured to update any of the one or more policies stored in policy data store 150. For example, a policy may indicate that workloads with a role label of "production" are able to communicate with one or more servers with a "production" label. Some of the workloads with a role label of "production" may behave in a manner that is different than the expected behavior. Orchestrator 160 can modify a policy associated with workloads with a role label of "production" such that workloads with a role label of "production" are no longer able to communicate with one or more servers with a "production" label. In some embodiments, orchestrator 160 is configured to modify the one or more functions enumerated in a policy (e.g., post, get, put, patch, delete, etc.) that workloads with a particular set of metadata are able to perform with respect to an endpoint. In other embodiments, orchestrator 160 is configured to modify the metadata that is attached to a workload. For example, a label of a workload can be changed from "red" to "blue." In some embodiments, orchestrator 160 is configured communicate with policy data store via a plugin (e.g, translation mechanism such as a neutron worker (in OpenStack) or CNI plugin (in the container networking interface model)).

In some embodiments, orchestrator 160 can be configured to close any of the one or more workloads 102, 104 on server 101 and to update any of the policies associated with the closed workloads. For example, a policy may be updated to indicate that a workload is no longer permitted to communicate with a particular endpoint.

The server is also coupled to endpoint 170 via network connection 165. Network connection 165 can be a local area network, a wide area network, a wired network, a wireless network, the Internet, an intranet, or any other appropriate communication network. Endpoint 170 can be a database server, an API server, or any other type of server external to server 101. Endpoint 170 can receive traffic from server 101 and also can send traffic to server 101.

Figure 2:
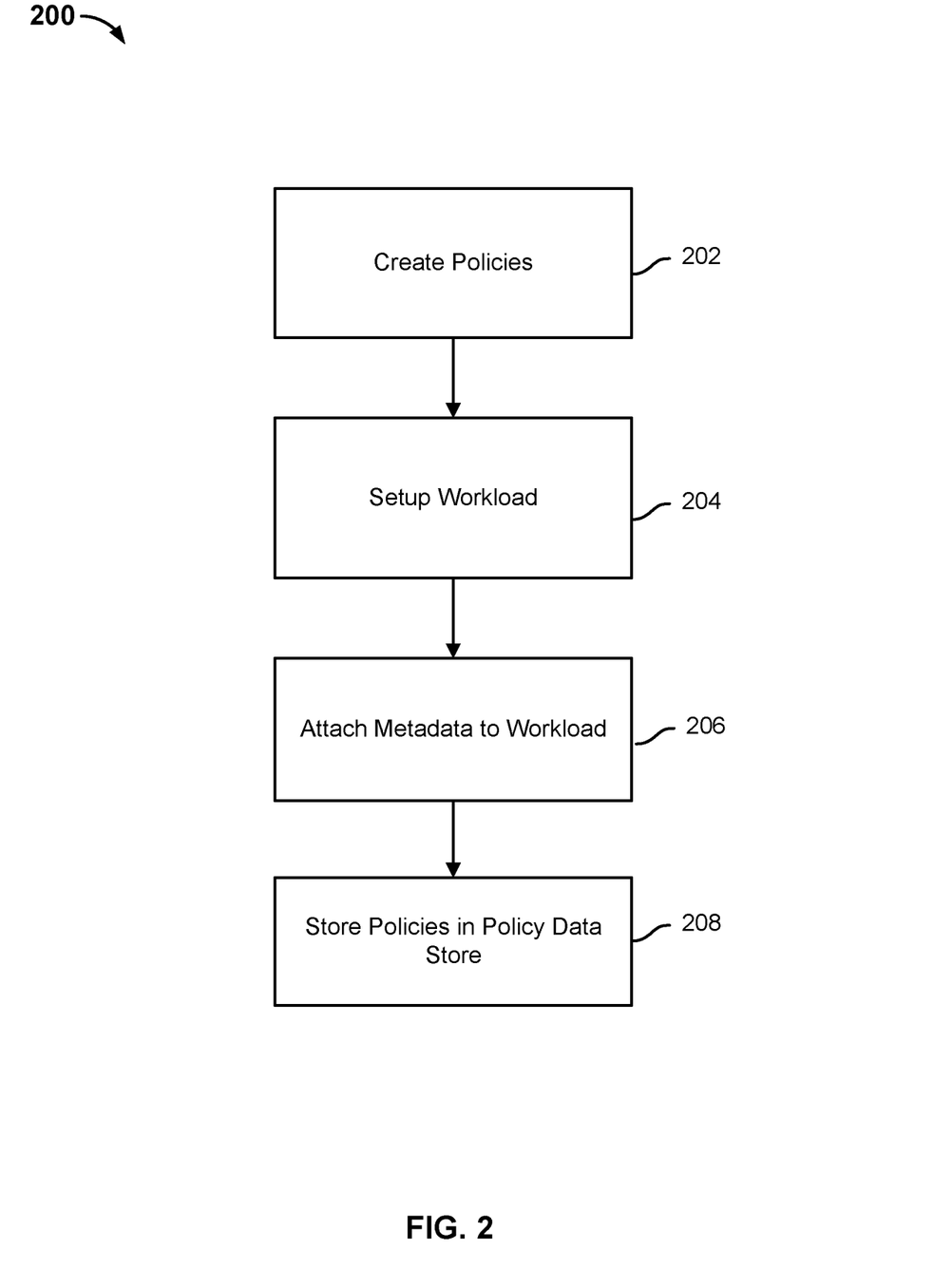
FIG. 2 is a flow chart illustrating an embodiment of a process for establishing policy control for a network environment.

FIG. 2 is a flow chart illustrating an embodiment of a process for establishing policy control for a network environment. In the example shown, process 200 can be performed by an orchestrator, such as orchestrator 160.

At 202, one or more policies are created. For example, a policy associated with load balancing can be created. The policy can specify how traffic associated with certain metadata is to be load balanced. A policy associated with application delivery control can be created. The policy can specify one or more services that a workload with certain metadata is permitted to access. A policy associated with transport or session cryptography can be created. The policy can specify the certificates or keys to be used for sessions between a workload with certain metadata and an endpoint.

At 204, a workload is setup. A setup notification can be transmitted to a server, which is then used to instantiate a workload and to assign an IP address to the workload. In some embodiments, the workload is assigned a particular address if the workload belongs to a particular tenant, or performs a particular function, and should be allocated an available ID address from a particular range associated with the particular tenant or particular function.

At 206, metadata is attached to the workload. The metadata can be a tag, label, key-value pair, etc. For example, the metadata can indicate a type of workload or a role associated with the workload (e.g., "development" or "production.")

At 208, the one or more policies are stored in a policy data store.

Figure 3:
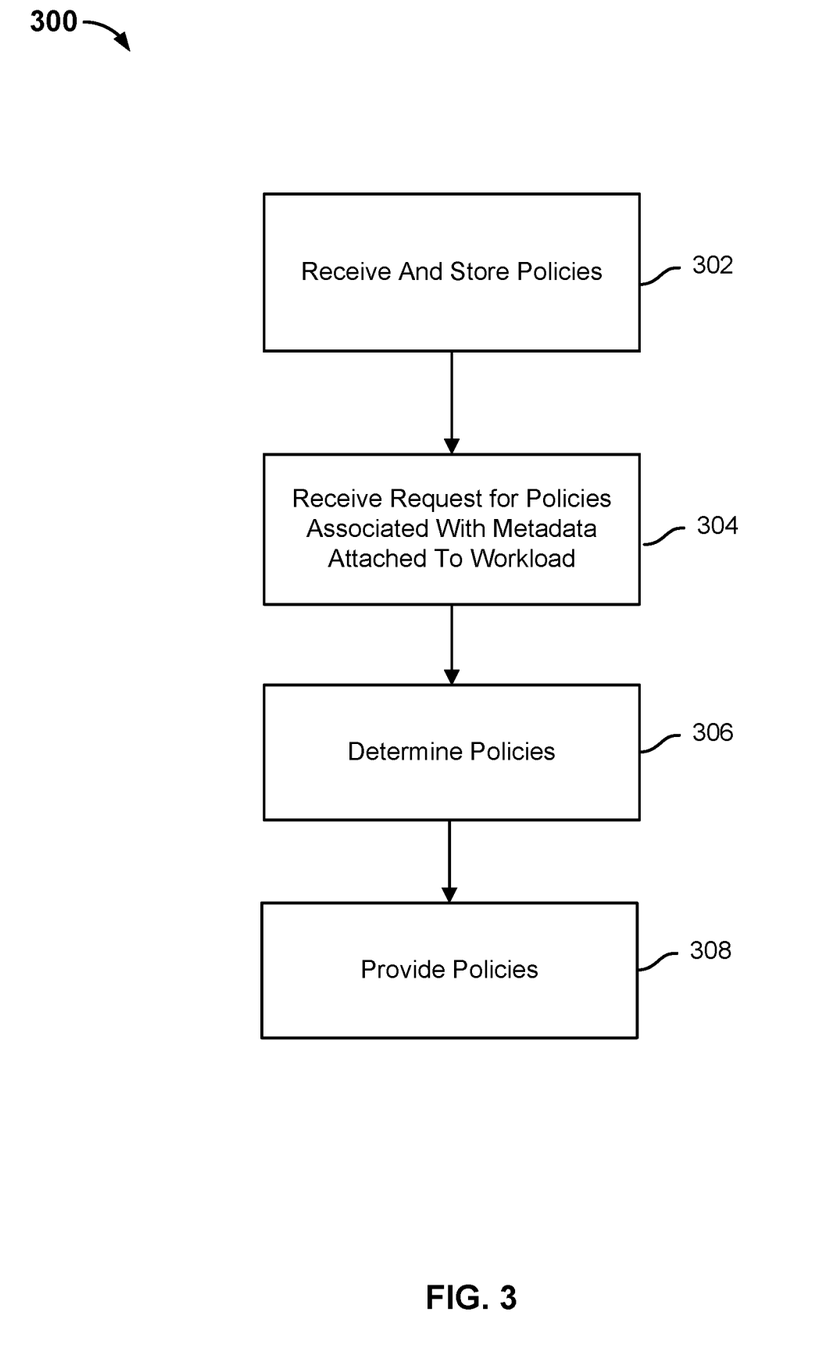
FIG. 3 is a flow chart illustrating an embodiment of a process for providing policies.

FIG. 3 is a flow chart illustrating an embodiment of a process for providing policies. In the example shown, process 300 can be performed by a policy data store, such as policy data store 150.

At 302, one or more policies are received from an orchestrator and stored. At 304, a request for one or more policies associated with metadata attached to a workload is received. For example, an agent can request a policy for a workload with a "red" label and a key-value pair of "role: production."

At 306, the one or more policies associated with the metadata attached to the workload are determined. For example, a policy data store may store a plurality of policies associated with a "red" label and a plurality of policies associated with a key-value pair of "role: production." The policy data store can determine which of the policies are associated with a "red" label and a key-value pair of "role: production."

At 308, the one or more determined policies are provided to the requesting agent.

Figure 4:
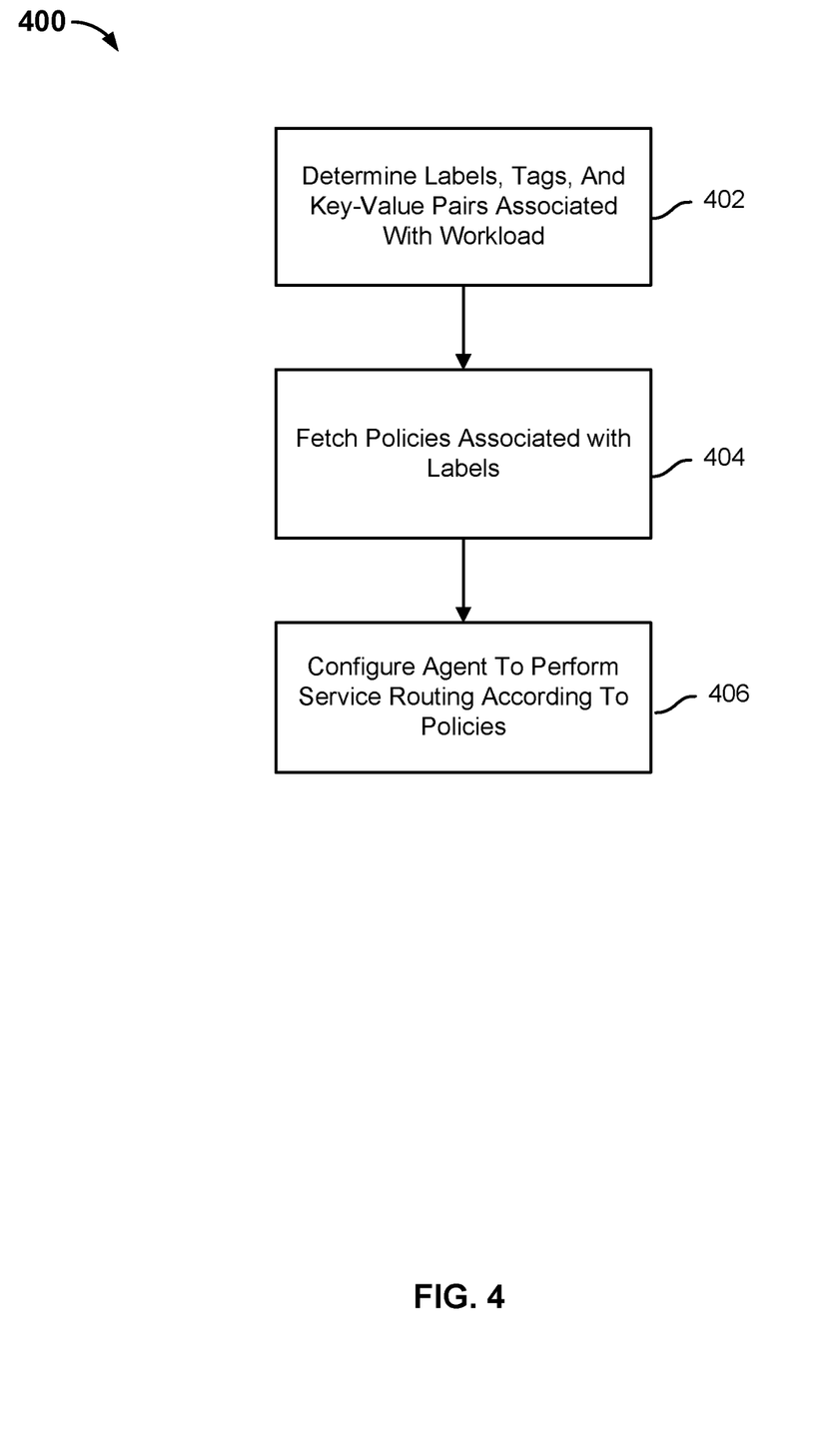
FIG. 4 is a flow chart illustrating an embodiment of a process for configuring an agent.

FIG. 4 is a flow chart illustrating an embodiment of a process for configuring an agent. In the example shown, process 400 can be performed by an agent, such as one of the one or more agents 120.

At 402, one or more labels, one or more tags, and/or one or more key-value pairs attached to a workload is determined. For example, a workload may have a "red" label and a key-value pair of "role: development." Such metadata describes the behavior and access associated with the workload.

At 404, one or more policies associated with the label(s), tag(s) and/or key-value pair(s) attached to the workload are fetched from a policy data store. The labels, tags, and/or key-value pairs can have a corresponding policy. In some embodiments, the one or more policies that are fetched match all the label(s), tag(s), and/or key-value pair(s) attached to a workload. In other embodiments, the one or more policies that are fetched match at least one of the label(s), tag(s), and/or key-value pair(s) attached to a workload.

At 406, the agent is configured to perform service routing according to the one or more policies. In some embodiments, the agent can be configured to perform load balancing according to the one or more policies associated with a workload. In some embodiments, the agent can be configured to deliver traffic between a workload and an endpoint according to the one or more policies associated with the workload. In some embodiments, the agent can be configured to enforce certain transport or session cryptography requirements according to the one or more policies associated with a workload.

Figure 5:
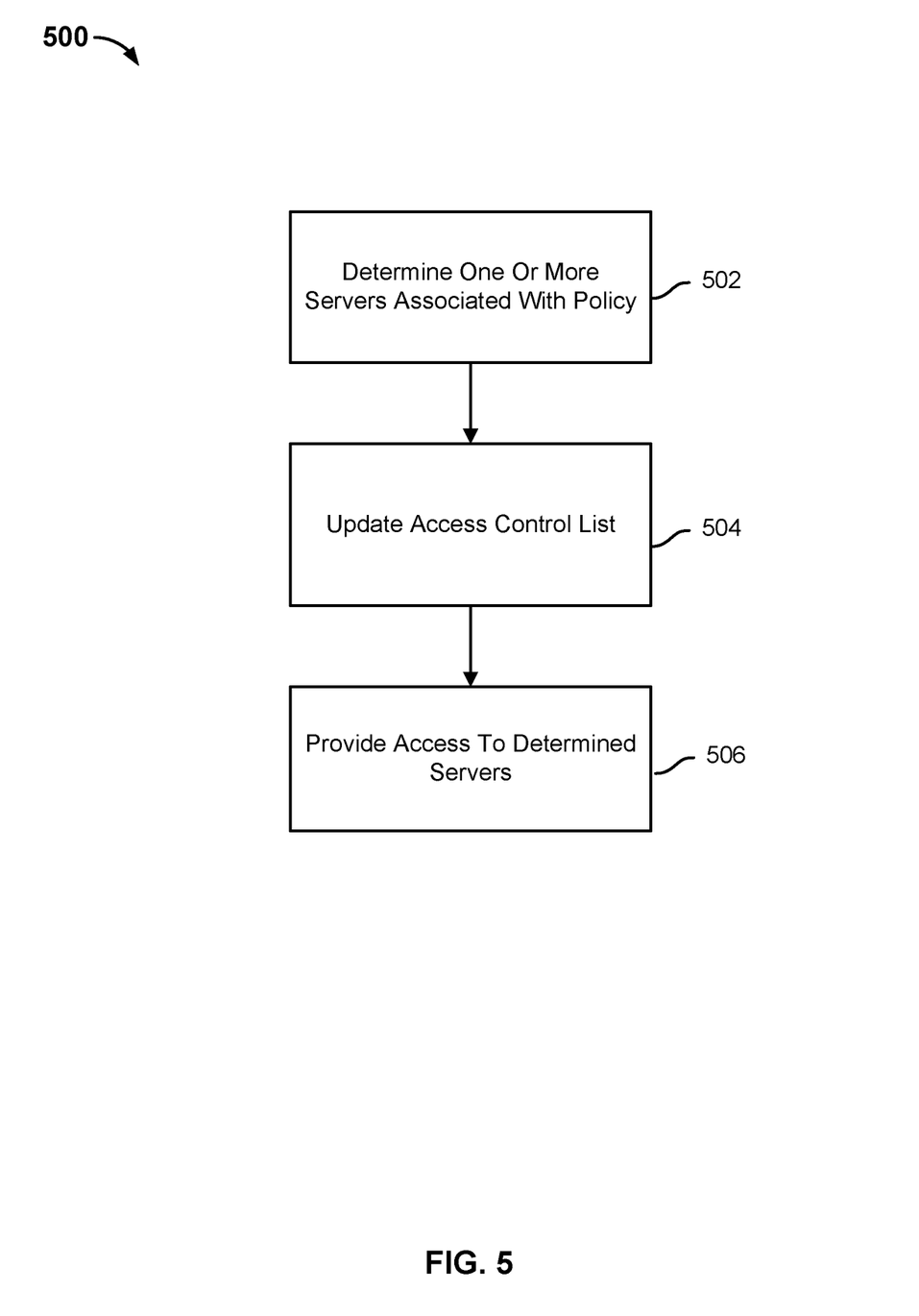
FIG. 5 is a flow chart illustrating an embodiment of a process for configuring an agent.

FIG. 5 is a flow chart illustrating an embodiment of a process for configuring an agent. In the example shown, process 500 can be performed by an agent, such as one of the one or more agents 120. Process 500 can be implemented to perform some or all of 406 of process 400.

At 502, one or more servers associated with a policy are determined. For example, a policy can indicate that a workload with a "red" label is permitted to communicate with server with a "red_db" label. An agent can receive a list of servers associated with a "red_db" label from a policy data store.

At 504, an ACL is updated based on the policy. For example, the ACL can be updated to reflect the one or more servers with a "red_db" label to which a workload with a "red" label is permitted to communicate.

At 506, access is provided to the determined servers based on the policy. For example, traffic between a workload with a "red" label and a server with a "red_db" label is permitted. In some embodiments, a policy can indicate a specific port for traffic from a workload to an endpoint is required. For example, a policy can indicate that traffic from a workload with a "red" label and a KVP of "role: production" to a "red_db" server requires that the traffic be forwarded to the "red_db" server via port 631. In other embodiments, a policy can indicate that a specific port for traffic from an endpoint to a workload is required. For example, a policy can indicate traffic from a server with a "blue" label to a workload with a "blue" label is to be received via port 8080. In some embodiments, the policies can indicate that different ports are used for traffic between workloads.

Figure 6:
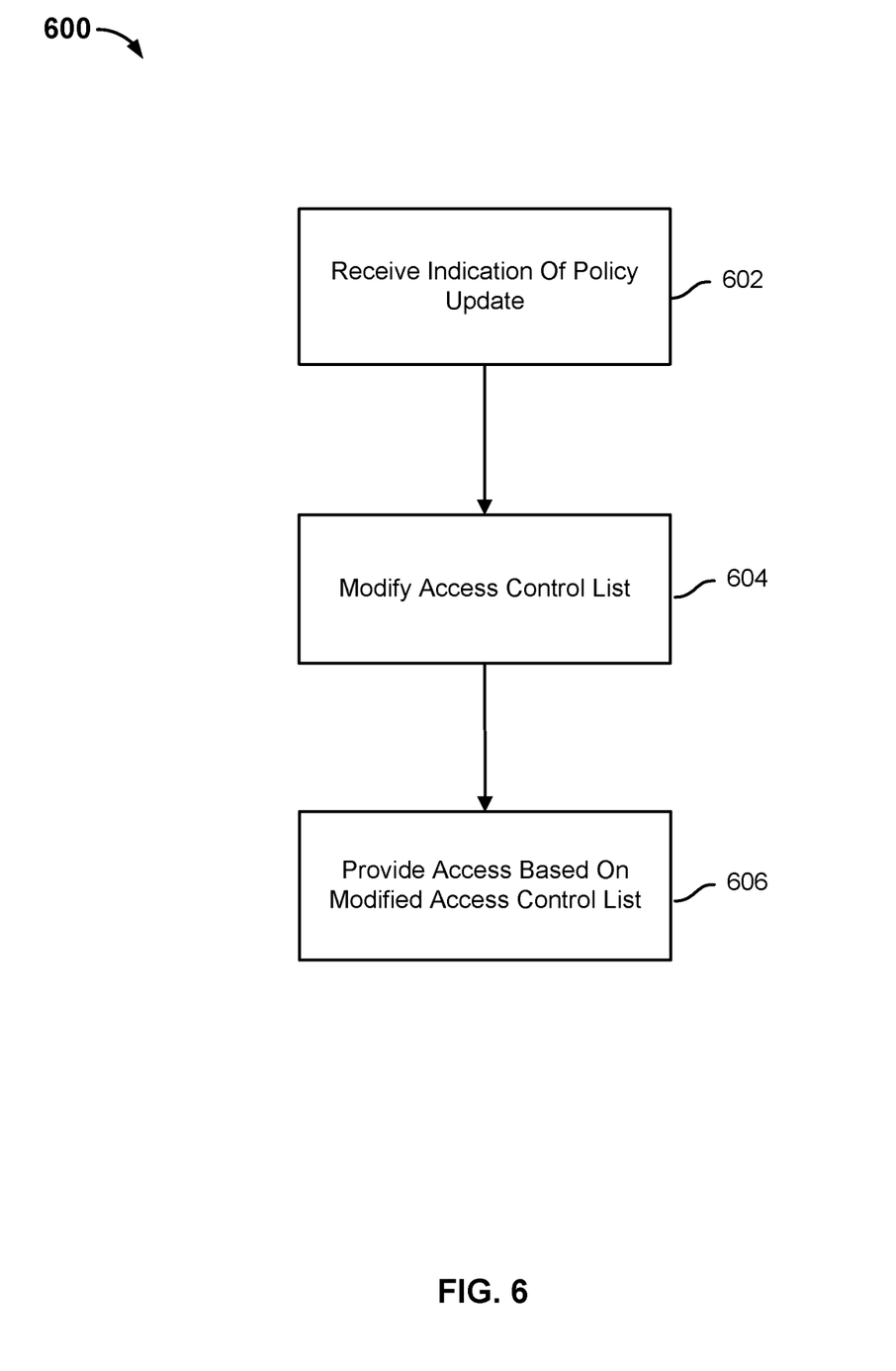
FIG. 6 is a flow chart illustrating an embodiment of a process for configuring an agent.

FIG. 6 is a flow chart illustrating an embodiment of a process for configuring an agent. In the example shown, process 600 can be performed by an agent, such as one of the one or more agents 120.

At 602, an indication that a policy associated with a workload has been updated is received. A policy data store can be configured to provide the indication to an agent when an orchestrator modifies a policy stored in the policy data store. For example, a policy can be updated to reflect a workload with a "red" label is no longer permitted to communicate with a server with a "red_db" label.

At 604, the ACL is modified based on the updated policy. For example, the ACL can be modified to reflect that a workload with a "red" label is no longer permitted to communicate with a server with a "red_db" label.

At 606, access is provided based on the modified ACL. For example, traffic between a workload with a "red" label and a server with a "red_db" label that was previously permitted is no longer permitted.

Figure 7:
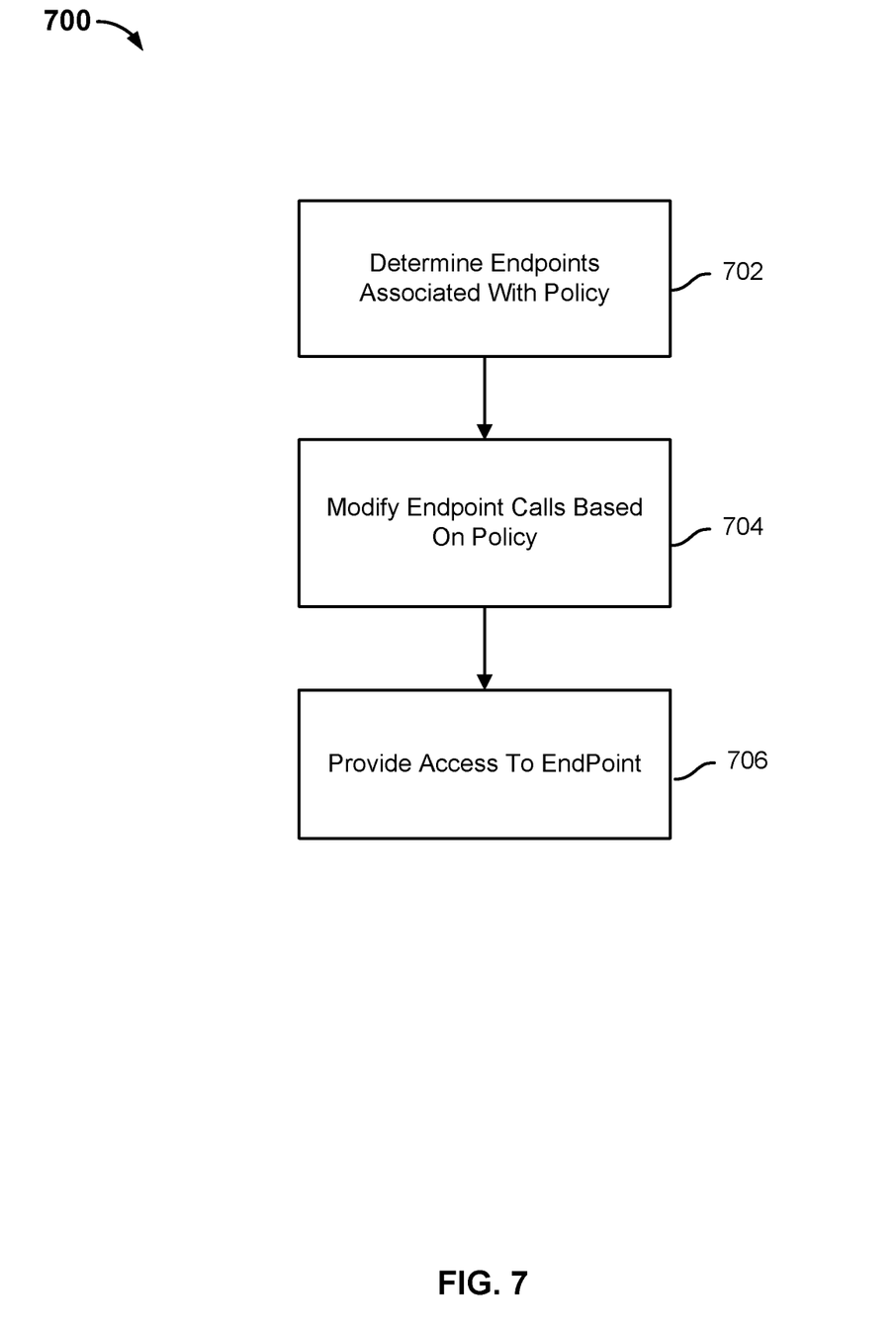
FIG. 7 is a flow chart illustrating an embodiment of a process for configuring an agent.

FIG. 7 is a flow chart illustrating an embodiment of a process for configuring an agent. In the example shown, process 700 can be performed by an agent, such as one of the one or more agents 120. Process 700 can be implemented to perform some or all of 406 of process 400.

At 702, one or more endpoints associated with a workload are determined. An endpoint can be a server, a URL, an API, etc. A default endpoint call associated with a workload (e.g., https://default_db_service/.../Get?x) may permit the workload to communicate a default endpoint. For example, the endpoint call may allow a workload to communicate with a "default_db_service." The metadata associated with a workload may change over time. For example, a key-value pair of a workload may change from "role: development" to "role: production." There may be specific database services to which a workload is permitted to communicate based on the key-value pair. For example, a workload with the key-value pair "role: development" may communicate with a "dev_db_service" instead of a "default_db_service." A workload with the key-value pair "role: production" may communicate with a "prod_db_service" instead of a default "default_db_service."

At 704, an endpoint call is modified based on a policy. A policy can indicate that a workload with particular metadata is permitted to communicate with a particular endpoint using a particular endpoint call. For example, a policy can indicate that a workload with the key-value pair "role: development" may communicate with a "dev_db_service" using an endpoint call of "https://dev_db_service/.../Get?x". A different policy can indicate that a workload with the key-value pair "role: production" may communicate with a "prod_db_service" using an endpoint call of "https://prod_db_service/.../Get?x". In some embodiments, the default endpoint call is replaced with an endpoint call specified in a policy. In other embodiments, a portion of the default endpoint call (e.g., "default_db_service") is replaced with an endpoint specified in a policy (e.g., "dev_db_service", "prod_db_service").

At 706, access is provided to the endpoint based on the modified endpoint call. For example, the modified endpoint call will be used in place of the default endpoint call.

Figure 8:
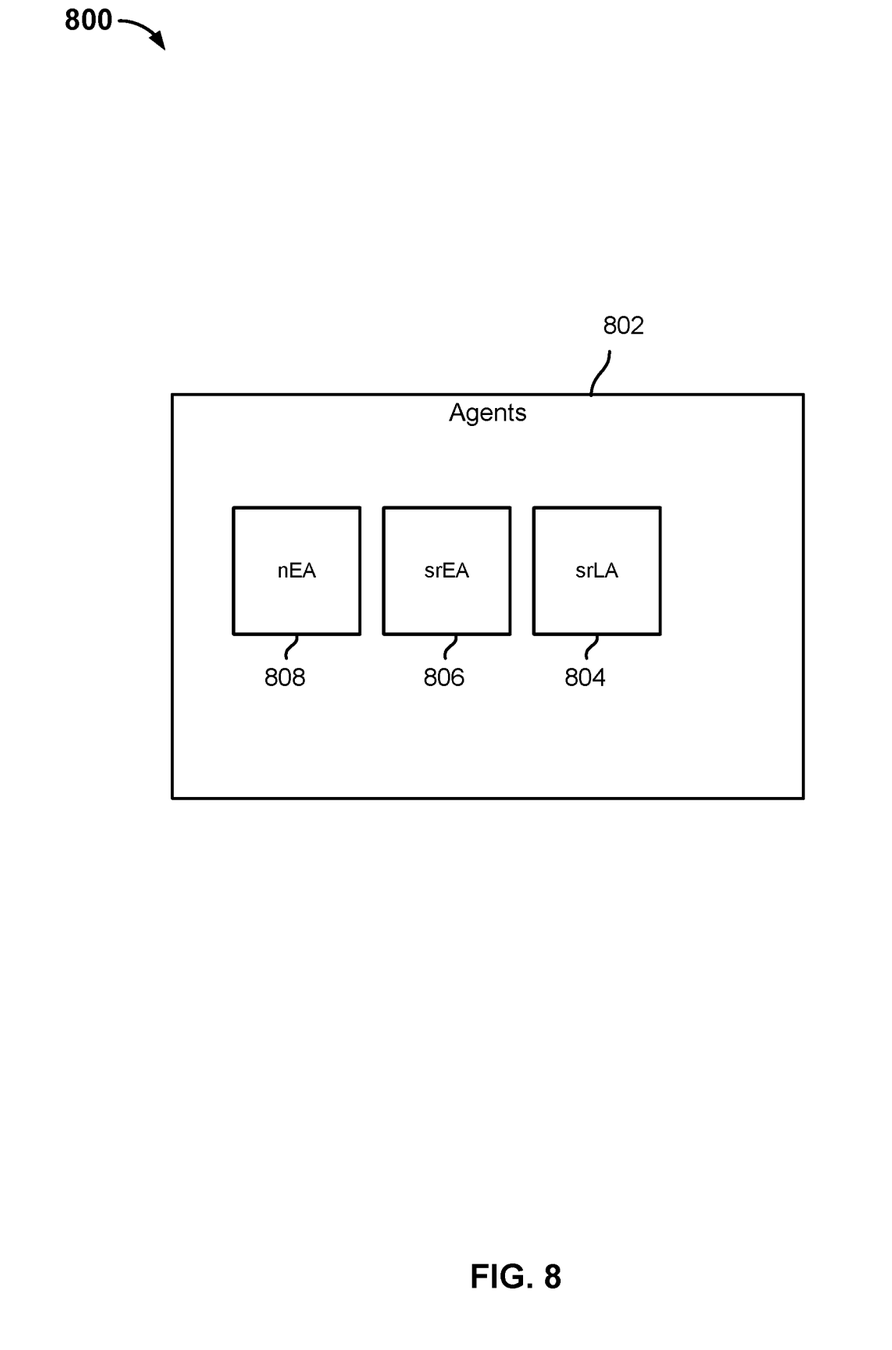
FIG. 8 is a block diagram illustrating an embodiment of an agent.

FIG. 8 is a block diagram illustrating an embodiment of an agent. In some embodiments, agent 802 can be used to implement some or all of agents 120.

Agent 802 can include a service routing Lookup Agent (srLA) 804, a service routing Enforcement Agent (srEA) 806, and/or a network Enforcement Agent (nEA) 808. In some embodiments, srEA 806 and nEA 808 can be combined into a single enforcement agent. In other embodiments, srLA 804, srEA 806, and nEA 808 can be combined into a single agent. In some embodiments, the enforcement agents can be implemented in a Linux kernel or user-space.

srLA 804 can be configured to determine metadata attached to a workload and to determine one or more policies associated with the attached metadata. srLA 804 can be configured to calculate and install one or more rules (e.g., load balancing, access control, URL rewrite, encryption, etc.) in srEA 804 to enforce the one or more determined policies. srLA 804 can be configured to install policy routing rules in nEA 808 to ensure that traffic that matches one or more service routing policies is directed to srEA 806. In the event a workload is removed from a service routing policy, srLA 804 is configured to remove the related rules installed in srEA 806.

srEA 806 can be configured to enforce one or more policies associated with one or more installed rules. srEA 806 can be configured to communicate with one or more srLAs to obtain a current state of the infrastructure. srEA 806 can be configured to forward a traffic flow to/from the workload. srEA 806 can be configured to install one or more flow rules in nEA 808 to cut-through (e.g., inspect first packet of traffic, allow other data packets to pass through) further traffic. srEA 806 can be configured to tear down flow rules installed in nEA 808 based on changes made to the infrastructure (e.g., workload is destroyed). srEA 806 can be configured to provide to one or more srLAs performance information associated with a session (e.g., latency, throughput, jitter, lost packets, etc.), which a srLA can use to make further routing decisions. The performance information can also be used to record performance data for later analysis and monitoring.

nEA 808 can be configured to route traffic that matches one or more service routing policies to srEA 808. For example, nEA 808 determines whether a networking layer (layers 3 and 4) is compatible with a service routing layer (layers 5-7). nEA 808 can determine whether a network policy allows a workload to communicate with an endpoint when a service routing policy indicates that the workload is able to communicate with the endpoint. If a network policy does not match a service routing policy, then even though a service routing policy may indicate that a workload can communicate with an endpoint, the network policy may prevent the communication between the workload and the endpoint.

Figure 9A:
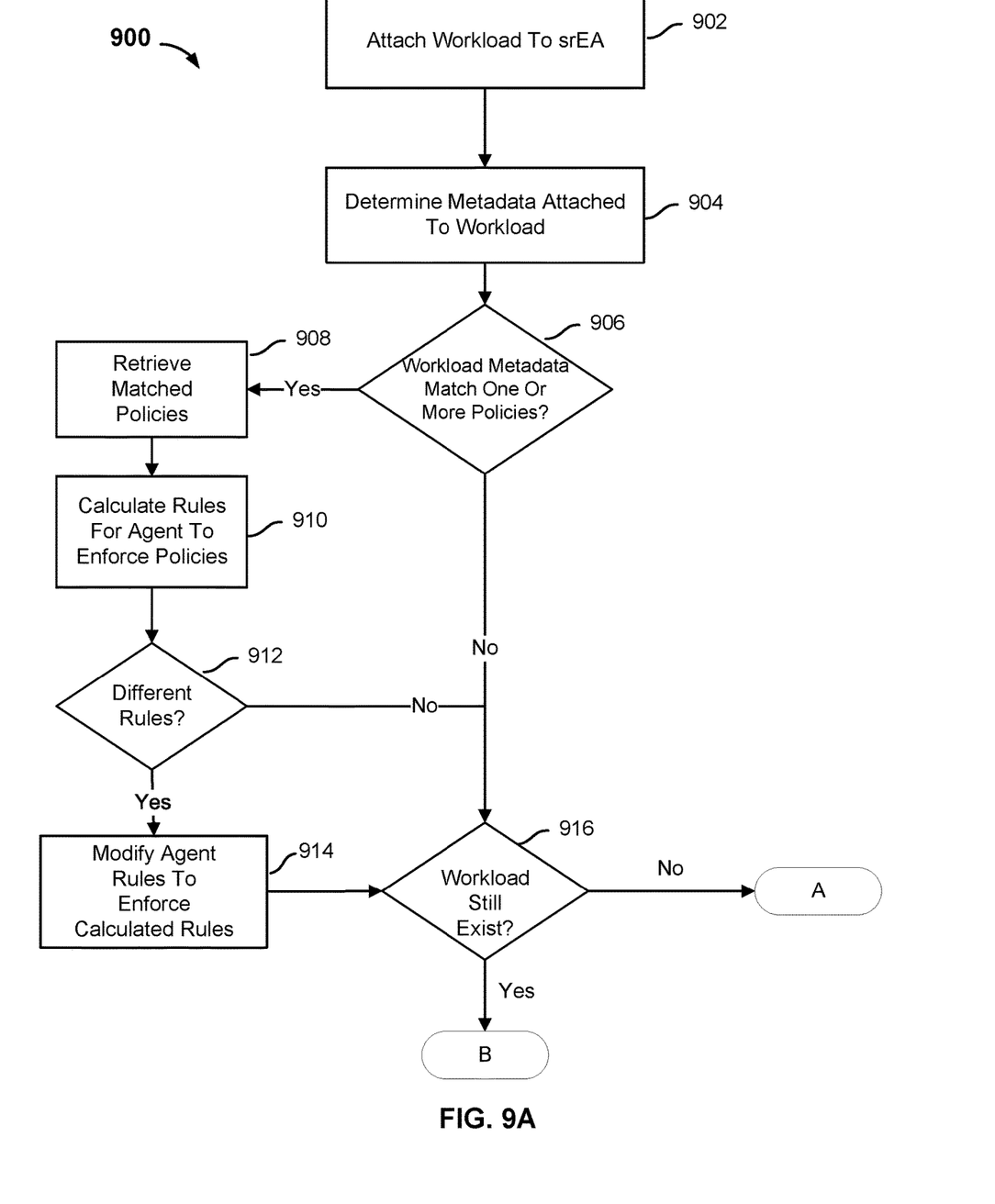
FIGS. 9A, 9B, and 9C is a flow chart illustrating an embodiment of a process for configuring a service routing enforcement agent.
Figure 9B:
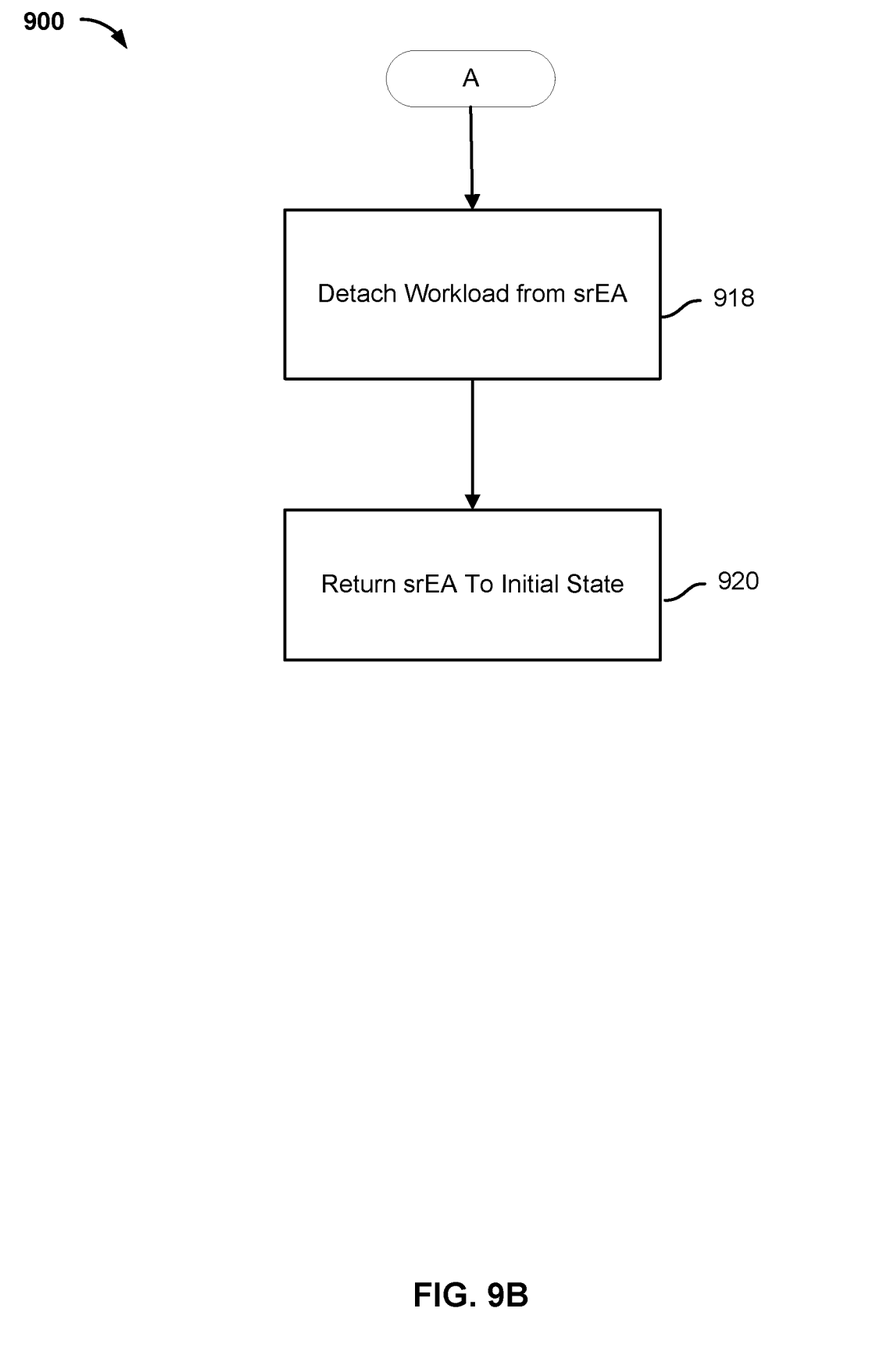
Figure 9C:
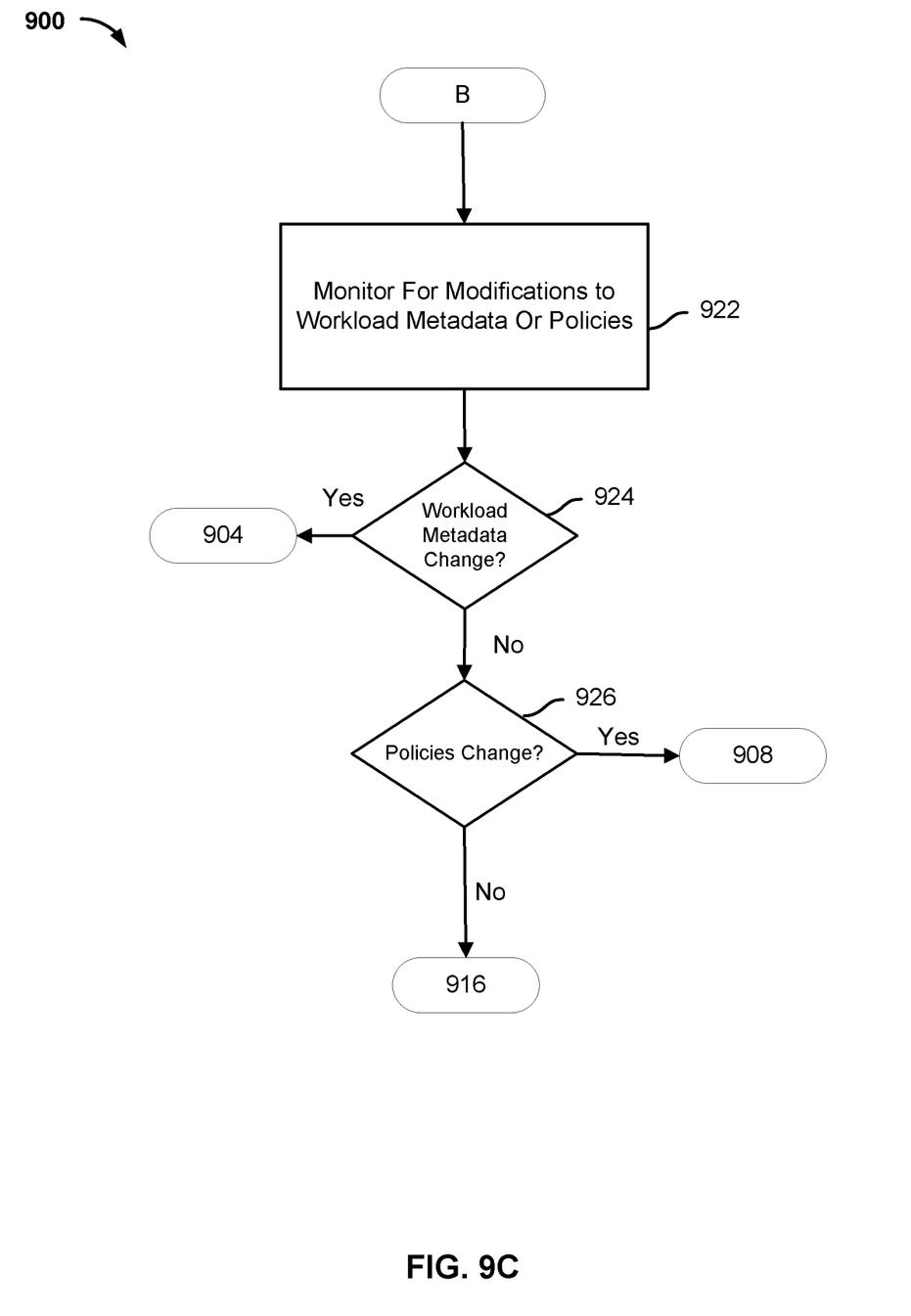

FIGS. 9A, 9B, and 9C is a flow chart illustrating an embodiment of a process for configuring a service routing enforcement agent. In the example shown, process 900 can be performed by a service routing lookup agent, such as srLA 804.

At 902, a workload is attached to a service routing enforcement agent. At 904, metadata attached to a workload is determined. At 906, it is determined whether the workload metadata matches one or more policies. In the event the workload metadata matches one of the one or more policies, process 900 proceeds to 908. In the event the workload metadata does not match one of the one or more policies, process 900 proceeds to 916.

At 908, the matched policies are retrieved. In some embodiments, the matched policies are retrieved from a policy data store. At 910, one or more rules for a srEA to enforce the policies are calculated. For example, one or more rules include load balancing, access control, URL rewrite, encryption, etc.

At 912, it is determined whether the calculated rules are different from the existing rules in the srEA. In the event the rules are different, the process proceeds to 914. In the event the rules are not different, the process proceeds to 916.

At 914, the rules in the srEA are modified to enforce the calculated rules.

At 916, it is determined whether the workload still exists. For example, a workload can be destroyed or moved to a different server. In the event it is determined that the workload does not exist anymore, the process proceeds to 918 where the workload is detached from the srEA. In the event it is determined that the workload still exists, the process proceeds to 922 where the workload metadata or policies are monitored for modifications.

At 920, the srEA is returned to its initial state.

At 924, it is determined whether a change has occurred to the workload metadata. In the event there is a change, the process proceeds to 904. In the event there is no change, the process proceeds to 926.

At 926, it is determined whether a change has occurred to a policy. In the event there is a change to the policy, the process proceeds to 908 and one or more matching policies are determined. In the event there is no change to a policy, the process proceeds to 916 and it is determined whether the workload still exists.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for policy-controlled service routing, comprising:
   a processor; and
   a memory coupled with the processor, wherein the memory is configured to provide the processor with instructions which when executed cause the processor to:
   determine by an agent hosted on a server in a cloud metadata associated with a workload, wherein an orchestrator is configured to attach the metadata to the workload, wherein the workload is hosted on the server in the cloud, wherein the metadata associated with the workload includes one or more labels and a particular key-value pair, wherein the particular key-value pair indicates a particular role for the workload within a computing environment;
   retrieve, by the agent, one or more policies associated with the metadata attached to the workload from a remote policy data store that is external to the server wherein the orchestrator is configured to store the one or more policies to the remote policy data store and to modify the one or more policies associated with the metadata attached to the workload, wherein a policy of the one or more policies associated with the metadata attached to the workload indicates that workloads having a particular label and the particular key-value pair are permitted to communicate with a first set of one or more other servers wherein the particular key-value pair indicates an initial role for the workload within the computing environment, wherein the agent is configured to subscribe to changes to the one or more policies;
   configure the agent to perform policy-controlled service routing of communications comprising data packets with respect to the workload based on the one or more retrieved policies associated with the metadata attached to the workload, wherein based on the one or more retrieved policies associated with the metadata attached to the workload, the agent is configured to permit the workload to communicate with the first set of one or more other servers having the one or more labels associated with the workload;

receive from the remote policy data store an updated version of the policy associated with the metadata attached to the workload, wherein the updated version of policy associated with the metadata attached to the workload indicates that the workload has a different key-value pair than the particular key-value pair wherein the different key-value pair indicates a different role for the workload within the computing environment, wherein the different role is different than the initial role, wherein the updated version of the policy associated with the metadata attached to the workload indicates that workloads having the particular label and the different key-value pair are not permitted to communicate with the first set of one or more other servers; and reconfigure the agent to perform policy-controlled service routing of communications with respect to the workload based on the updated version of the policy associated with the metadata attached to the workload, wherein the workload is permitted to communicate with a second set of one or more other servers.

2. The system of claim 1, wherein the metadata is associated with the workload based at least in part on an attribute of the workload.

3. The system of claim 1, wherein to configure the agent, the instructions further cause the processor to:
   determine one or more endpoints associated with the one or more retrieved policies;
   update an access control list based on the determined one or more endpoints; and
   provide access from the workload to the determined one or more endpoints.

4. The system of claim 1, wherein the instructions further cause the processor to:
   receive an indication of the updated version of the policy associated with the metadata attached to the workload;
   modify an access control list based on the indication; and
   provide access from the workload to one or more endpoints based on the modified access control list.

5. The system of claim 1, wherein to configure the agent, the instructions further cause the processor to:
   determine one or more endpoints associated with the one or more retrieved policies;
   modify an endpoint call associated with the one or more endpoints based on the one or more policies; and
   provide access to the one or more endpoints using the modified endpoint call.

6. The system of claim 1, wherein the one or more policies include a load balancing policy.

7. The system of claim 1, wherein the one or more policies include an encryption requirement associated with traffic between the workload and an endpoint.

8. The system of claim 1, wherein the orchestrator is configured to update the metadata associated with the workload.

9. The system of claim 1, further comprising a proxy to redirect traffic to/from the workload.

10. A method, comprising:
    determining, by an agent hosted on a server in a cloud, metadata associated with a workload, wherein an orchestrator attaches the metadata to the workload, wherein the workload is hosted on the server in the cloud, wherein the metadata associated with the workload includes one or more labels and a particular key-value pair, wherein the particular key-value pair indicates a particular role for the workload within a computing environment;

retrieving, by the agent, one or more policies associated with the metadata attached to the workload from a remote policy data store that is external to the server wherein the orchestrator stores the one or more policies to the remote policy data store and modifies the one or more policies associated with the metadata attached to the workload, wherein a policy of the one or more policies associated with the metadata attached to the workload indicates that workloads having a particular label and the particular key-value pair are permitted to communicate with a first set of one or more other servers wherein the particular key-value pair indicates an initial role for the workload within the computing environment, wherein the agent is configured to subscribe to changes to the one or more policies;

configuring the agent to perform policy-controlled service routing of communications comprising data packets with respect to the workload based on the one or more retrieved policies associated with the metadata attached to the workload, wherein based on the one or more retrieved policies associated with the metadata attached to the workload, the agent is configured to permit the workload to communicate the first set of one or more other servers having the one or more labels associated with the workload;

receiving from the remote policy data store an updated version of the policy associated with the metadata attached to the workload, wherein the updated version of policy associated with the metadata attached to the workload indicates that the workload has a different key-value pair than the particular key-value pair, wherein the different key-value pair indicates a different role for the workload within the computing environment, wherein the different role is different than the initial role, wherein the updated version of the policy associated with the metadata attached to the workload indicates that workloads having the particular label and the different key-value pair are not permitted to communicate with the first set of one or more other servers; and reconfiguring the agent to perform policy-controlled service routing of communications with respect to the workload based on the updated version of the policy associated with the metadata attached to the workload, wherein the workload is permitted to communicate with a second set of one or more other servers.

11. The method of claim 10, wherein configuring the agent comprises:
    determining one or more endpoints associated with the one or more retrieved policies;
    updating an access control list based on the determined one or more endpoints; and
    providing access from the workload to the determined one or more endpoints.

12. The method of claim 10, wherein configuring the agent comprises:
    receiving an indication of an update to one of the one or more policies;
    modifying an access control list based on the indication; and
    providing access from the workload to one or more endpoints based on the modified access control list.

13. The method of claim 10, wherein configuring the agent comprises:

determining one or more endpoints associated with the one or more retrieved policies;

modifying an endpoint call associated with the one or more endpoints based on the one or more policies; and providing access to the one or more endpoints using the modified endpoint call.

14. A non-transitory computer readable storage medium comprising computer instructions, which when executed by a processor cause the processor to perform the steps of:

determining, by an agent hosted on a server in a cloud, metadata associated with a workload, wherein an orchestrator is configured to attach the metadata to the workload, wherein the workload is hosted on the server in the cloud, wherein the metadata associated with the workload include one or more labels and a particular key-value pair, wherein the particular key-value pair indicates a particular role for the workload within a computing environment;

retrieving, by the agent, one or more policies associated with the metadata attached to the workload from a remote policy data store that is external to the server wherein the orchestrator stores the one or more policies to the remote policy data store and modifies the one or more policies associated with the metadata attached to the workload, wherein a policy of the one or more policies associated with the metadata attached to the workload indicates that workloads having a particular label and the particular key-value pair are permitted to communicate with a first set of one or more other servers wherein the particular key-value pair indicates an initial role for the workload within the computing environment, wherein the agent is configured to subscribe to changes to the one or more policies;

configuring the agent to perform policy-controlled service routing of communications comprising data packets with respect to the workload based on the one or more retrieved policies associated with the metadata attached to the workload, wherein based on the one or more retrieved policies associated with the metadata attached to the workload, the agent is configured to permit the workload to communicate with the first set of one or more other servers having the one or more labels associated with the workload;

receiving from the remote policy data store an updated version of the policy associated with the metadata attached to the workload, wherein the updated version of policy associated with the metadata attached to the workload indicates that the workload has a different key-value pair than the particular key-value pair, wherein the different key-value pair indicates a different role for the workload within the computing environment, wherein the different role is different than the initial role, wherein the updated version of the policy associated with the metadata attached to the workload indicates that workloads having the particular label and the different key-value pair are not permitted to communicate with the first set of one or more other servers; and reconfiguring the agent to perform policy-controlled service routing of communications with respect to the workload based on the updated version of the policy associated with the metadata attached to the workload, wherein the workload is permitted to communicate with a second set of one or more other servers.

15. The system of claim 1, wherein the updated policy associated with the metadata attached to the workload indicates that workloads having the particular label are permitted to communicate with the second set of one or more other servers instead of the first set of one or more other servers.

16. The system of claim 1, wherein a second policy of the one or more policies associated with the metadata attached to the workload indicates that workloads having a particular label are permitted to communicate with a particular endpoint using a particular endpoint call.

17. The system of claim 8, wherein the agent is configured to perform policy-controlled service routing of communications with respect to the workload based on the updated metadata associated with the workload.

* * * * *

UNITED STATES PATENT AND TRADEMARK OFFICE
CERTIFICATE OF CORRECTION

PATENT NO. : 10,931,744 B1
APPLICATION NO. : 15/585095
DATED : February 23, 2021
INVENTOR(S) : Christopher David Liljenstolpe Page 1 of 1

It is certified that error appears in the above-identified patent and that said Letters Patent is hereby corrected as shown below:

In the Claims

In Column 10, Line(s) 35, Claim 1, after "determine", insert --,--.

In Column 10, Line(s) 35, Claim 1, after "cloud", insert --,--.

In Column 10, Line(s) 46, Claim 1, after "server", insert --,--.

In Column 10, Line(s) 55, Claim 1, after "servers", insert --,--.

In Column 11, Line(s) 9, Claim 1, after "pair", insert --,--.

In Column 12, Line(s) 6, Claim 10, after "server", insert --,--.

In Column 12, Line(s) 15, Claim 10, after "servers", insert --,--.

In Column 13, Line(s) 21, Claim 14, after "server", insert --,--.

In Column 13, Line(s) 30, Claim 14, after "servers", insert --,--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*